United States Patent
Liu

(10) Patent No.: US 8,222,829 B2
(45) Date of Patent: Jul. 17, 2012

(54) DRIVER CIRCUIT AND METHOD FOR DRIVING LOAD CIRCUIT

(75) Inventor: Jing-Meng Liu, Zhubei (TW)

(73) Assignee: Richtek Technology Corporation, Hsin-Chu (TW)

( * ) Notice: Subject to any disclaimer, the term of this patent is extended or adjusted under 35 U.S.C. 154(b) by 326 days.

(21) Appl. No.: 12/799,108

(22) Filed: Apr. 19, 2010

(65) Prior Publication Data

US 2011/0012537 A1 Jan. 20, 2011

(30) Foreign Application Priority Data

Jul. 15, 2009 (TW) ................................ 98123921 A

(51) Int. Cl.
*H05B 41/38* (2006.01)
*H05B 37/02* (2006.01)

(52) U.S. Cl. ........................ 315/224; 315/294; 315/307

(58) Field of Classification Search .................. 315/212, 315/224, 225, 246, 291, 307, 294
See application file for complete search history.

(56) References Cited

U.S. PATENT DOCUMENTS

| 3,524,986 A * | 8/1970 | Harnden, Jr. ............... 250/214 R |
| 2009/0195183 A1 * | 8/2009 | Yang ............................... 315/294 |
| 2011/0227497 A1 * | 9/2011 | Hu et al. ........................ 315/224 |

* cited by examiner

*Primary Examiner* — Don Le
(74) *Attorney, Agent, or Firm* — Tung & Associates

(57) ABSTRACT

The present invention discloses a driver circuit and a method for driving a load circuit. The driver circuit includes: a primary side circuit receiving rectified AC power; a transformer coupled to the primary side circuit and converting a primary voltage to a secondary voltage which is supplied to a load circuit; and a secondary side circuit coupled to the transformer, the secondary side circuit detecting current flowing through the load circuit and feedback controlling the primary side circuit accordingly.

18 Claims, 5 Drawing Sheets

– – – Under-damping; C3 too low and/or C4 too high

——— Critical-damping; C3 and/or C4 optimized

·········· Over-damping; C3 too high and/or C4 too low

DRIVER CIRCUIT AND METHOD FOR DRIVING LOAD CIRCUIT

BACKGROUND OF THE INVENTION

1. Field of Invention

The present invention relates to a driver circuit and a method for driving a load circuit; particularly, it relates to a light emitting diode (LED) driver circuit and a method for driving LEDs, which require less number of circuit devices and are able to control LED brightness from the AC side.

2. Description of Related Art

Referring to FIG. 1, conventionally, to provide power to an LED circuit from an AC power supply, it requires an AC-DC power regulator 10 to convert an AC voltage to a DC voltage, and an LED driver circuit 20 to provide electrical power to the LED circuit 50 and control current through the LEDs. Besides a transformer, the AC-DC power regulator 10 further comprises a primary side circuit 11, a secondary side circuit 12, and other discrete devices such as a capacitor C2, a diode D2, etc. The secondary side circuit 12 detects the output voltage and provides a feedback signal to the primary side circuit 11 by means of opto-coupling to control the operation of a power switch P in the primary side circuit 11.

The aforementioned prior art has the following drawbacks. Because it requires the AC-DC power regulator 10 to generate a regulated voltage and the LED driver circuit 20 to control current through the LED circuit 50 according to the regulated voltage, the prior art circuitry needs at least three integrated circuit (IC) chips: the primary side circuit 11, the secondary side circuit 12, and the LED driver circuit 20; this is not cost-effective. Besides, there is not a method to control the LED brightness directly from the AC side.

In view of the above drawbacks, it is desired to provide a driver circuit and a method for driving a load circuit.

SUMMARY OF THE INVENTION

The first objective of the present invention is to provide a driving circuit, which for example can be applied to driving an LED circuit.

The second objective of the present invention is to provide a method for driving a load.

To achieve the objectives mentioned above, from one perspective, the present invention provides a driver circuit comprising: a primary side circuit receiving rectified AC power; a transformer coupled to the primary side circuit and converting a primary voltage to a secondary voltage which is supplied to a load circuit; a secondary side circuit coupled to the transformer, the secondary side circuit detecting current flowing through the load circuit and feedback-controlling the primary side circuit accordingly; a first capacitor coupled to the secondary side circuit for providing an operation voltage to the secondary side circuit; and a second capacitor coupled to the load circuit for providing an operation voltage to the load circuit and an optocoupler device, wherein the primary side circuit has an enable input for receiving an input duty signal, and when the input duty signal dose not enable the primary side circuit, the first capacitor still provides the operation voltage to the secondary side circuit at least for a predetermined period.

In one embodiment of the aforementioned driver circuit, the duty signal is generated by an AC signal extraction and conversion circuit according to a TRIAC signal. The duty signal can be used to control current flowing through the load circuit.

From another perspective, the present invention provides a method for driving a load circuit comprising: providing a primary side circuit receiving rectified AC power; providing a transformer coupled to the primary side circuit and converting a primary voltage to a secondary voltage which is supplied to the load circuit; providing a secondary side circuit coupled to the transformer, the secondary side circuit supplying the secondary voltage to the load circuit; enabling the primary side circuit according a duty signal; and keeping the secondary side circuit in an operation mode at least for a predetermined period when the duty signal does not enable the primary side circuit.

In one embodiment of the aforementioned method, the step of keeping the secondary side circuit in an operation mode includes: coupling the secondary side circuit with a first capacitor; and coupling the load circuit and an optocoupler device with a second capacitor.

In the aforementioned method, the capacitance of the second capacitor can be adjusted according to the damping status when driving the load circuit.

The objectives, technical details, features, and effects of the present invention will be better understood with regard to the detailed description of the embodiments below.

DESCRIPTION OF THE PREFERRED EMBODIMENTS

Figure 1:
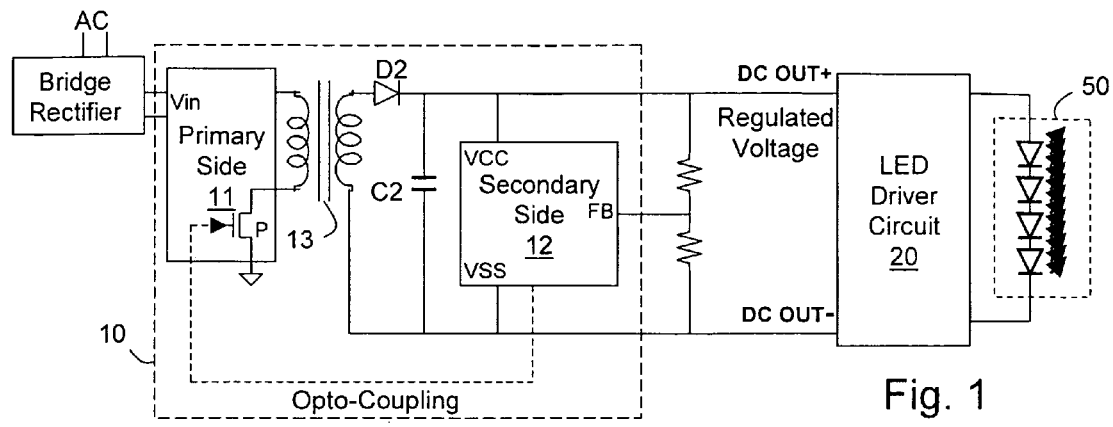
FIG. 1 shows a prior art circuitry which includes an AC-DC power regulator 10 to convert an AC voltage to a DC voltage, and an LED driver circuit 20 to provide electrical power to an LED circuit 50.
Figure 2:
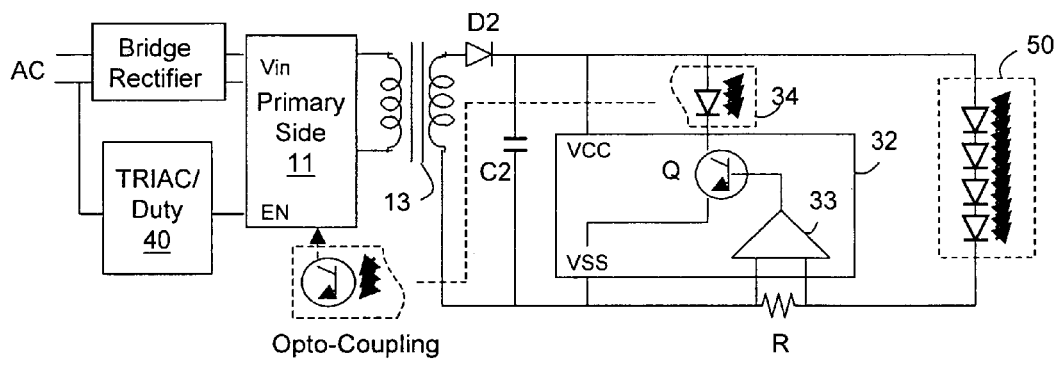
FIG. 2 shows a first embodiment of the present invention.

FIG. 2 shows a first embodiment of the present invention. In this embodiment, it is not required to provide two IC chips, the secondary side circuit 12 and the LED driver circuit 20, as in the prior art. As shown in FIG. 2, the driver circuit of this embodiment comprises: a primary side circuit 11 receiving rectified AC power; a transformer 13 coupled to the primary side circuit 11 and converting a primary voltage to a secondary voltage; and a secondary side circuit 32 coupled to the transformer 13 for providing a secondary side voltage to the load circuit 50. The load circuit 50 is shown to be an LED circuit for example, but it can be any other circuit which requires current control. In this embodiment, the secondary side circuit 32 directly detects current through the load circuit 50, and generates a feedback signal thereby; the feedback signal is sent to the primary side circuit 11 by means of opto-coupling. There are various ways to detect current through the LED circuit 50; as one example, FIG. 2 shows that a resist R can be provided and connected with the LED circuit in series, and the voltage across the resist R is an indicator of the current through the LED circuit 50. By comparing the voltage difference between two ends of the resist R, information related to the current through the LED circuit 50 can be obtained.

The embodiment of FIG. 2 further comprises an AC signal extraction and conversion circuit (TRIAC/Duty) 40 for generating a duty signal according to an inputted AC signal. With minor circuit modification, the AC signal extraction and conversion circuit (TRIAC/Duty) 40 can extract AC signal from the node either before or after the Bridge Rectifier. (TRIAC: TRIode for Alternating Current, which means to extract a portion of an AC signal and generate a positive truncated semi-sinusoidal wave; for more details, please refer to FIGS. 11 and 12). The duty signal outputted from the TRIAC/Duty 40 is inputted to an enable input terminal EN of the primary side circuit 11, to serve as a dimming signal for adjusting the brightness of the LED. More specifically, when the TRIAC signal is ON such that the duty signal received by the input terminal EN is at high level or ON, the primary side circuit 11 is enabled, and the circuit supplies electrical power to the LEDs; when the TRIAC signal is OFF such that the duty signal received by the input terminal EN is at low level or OFF, the primary side circuit 11 is disabled, and the LEDs are OFF. As such, the duty ratio of the duty signal controls the average current through the LEDs, that is, the brightness of the LED (what human eyes observed is the average brightness).

Figure 11:
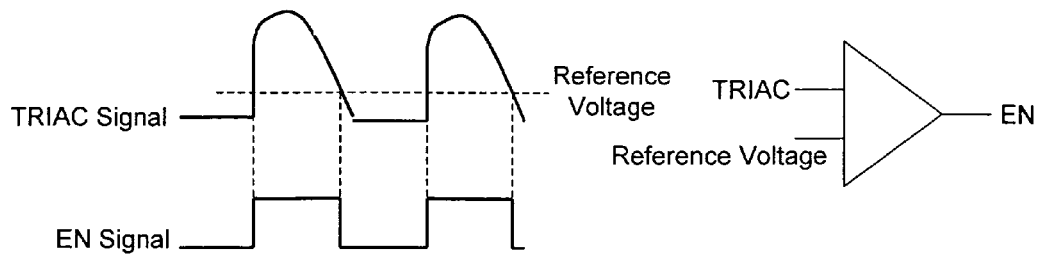
FIG. 11 and FIG. 12 show two embodiments of generating an EN signal according to a TRIAC signal.
Figure 12:
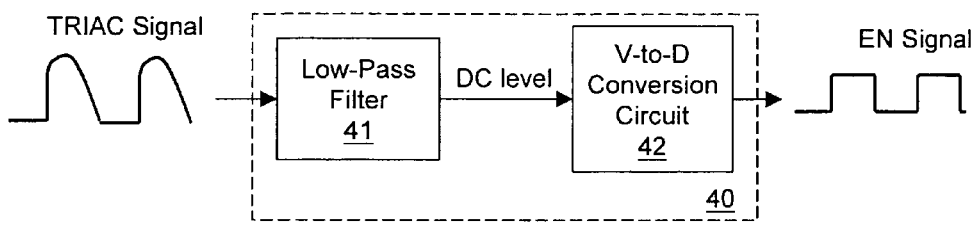

FIG. 11 and FIG. 12 show two examples as to how the AC signal extraction and conversion circuit 40 generates the duty signal according to the TRIAC signal. An AC signal is processed to obtain the TRIAC signal as shown in FIG. 11; the TRIAC signal is a truncated AC signal, or a signal with a positive correlation to the truncated AC signal, such as a voltage-divident signal thereof. The AC signal extraction and conversion circuit 40 for example includes a comparator, which compares the TRIAC signal with a reference signal to generate the duty signal (EN signal). Or as shown in FIG. 12, for another example, the AC signal extraction and conversion circuit 40 includes a low-pass filter 41 and a voltage-to-duty (V-to-D) conversion circuit 42, in which the low-pass filter 41 obtains the DC level (or an average) of the TRIAC signal, and the V-to-D conversion circuit 42 converts the DC level to the duty signal.

Figure 4:
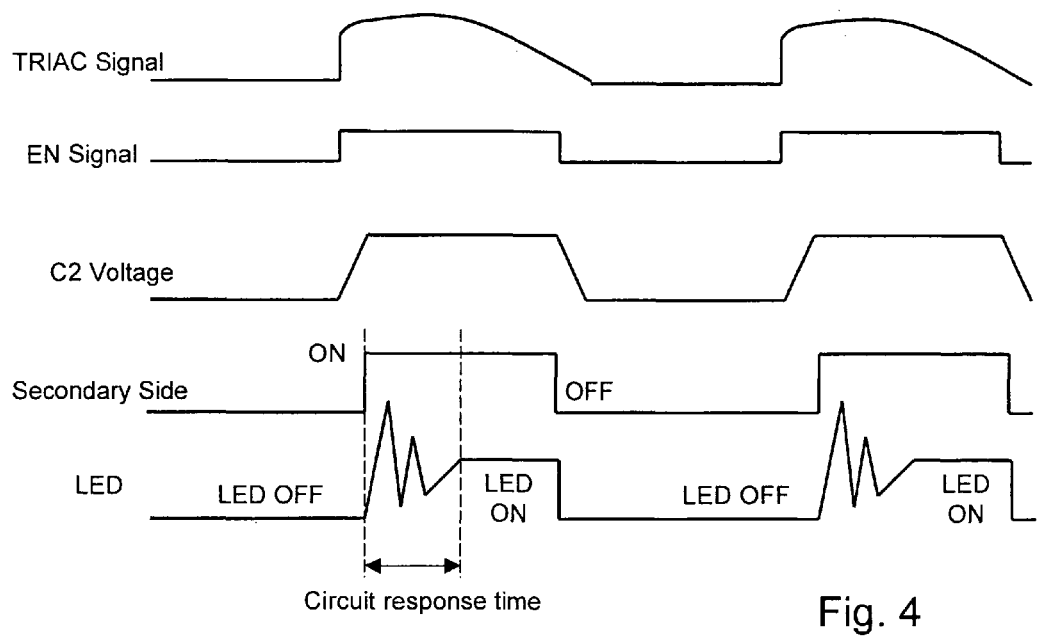
FIG. 4 explains that the precision of average brightness of the LED circuit 50 is lower than desired.

In the embodiment shown in FIG. 2, when the duty signal (i.e., the EN signal) inputted to the enable input terminal EN of the primary side circuit 11 switches from low level to high level, it takes some time for the capacitor C2 to be charged, and therefore as shown in FIG. 4, the secondary side circuit 32 (same for the secondary side circuit 12 in the prior art) does not start operating until the voltage across the capacitor C2 reaches a specific level. And after the secondary side circuit 32 starts operating, a circuit settling time is required for the LED circuit 50 to illuminate stably. In other words, the average brightness of the LED circuit 50 does not precisely correspond to the duty of the EN signal. One way to resolve this issue is to separate the supply voltage for the secondary side circuit 32 from the supply voltage for the LED circuit 50, as depicted below.

Figure 3:
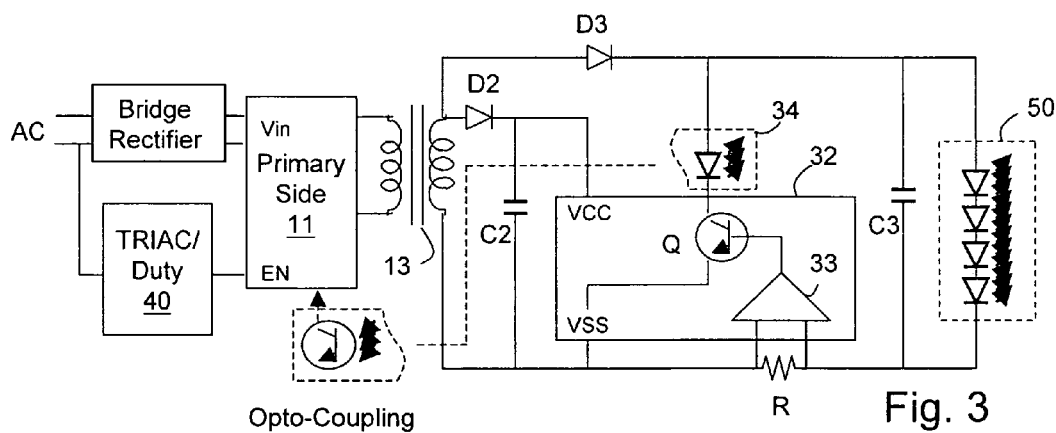
FIG. 3 shows a second embodiment of the present invention.
Figure 5:
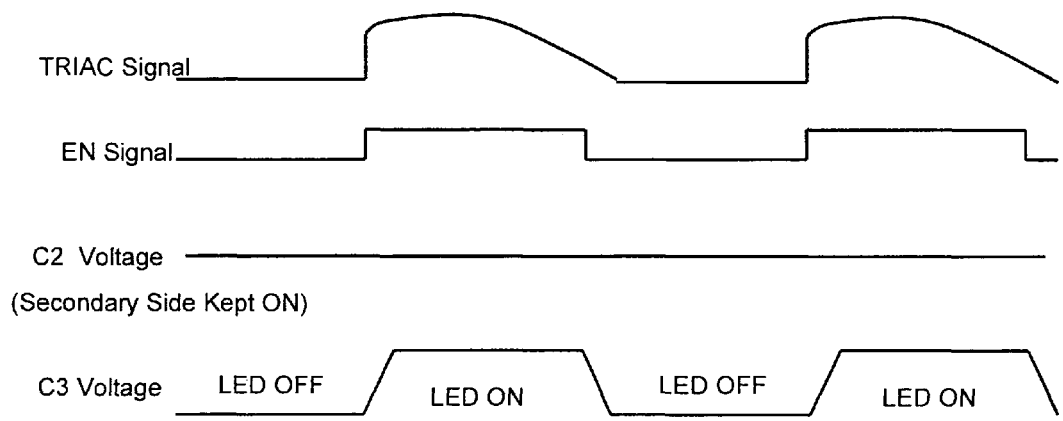
FIG. 5 shows one method of the present invention to solve the problem of the lower precision of average brightness of the LED circuit 50.

Referring to FIG. 3, in this embodiment, the circuit further comprises a capacitor C3 and a diode D3. The operation voltage of the secondary side circuit 32 in this embodiment is from the capacitor C2, and the operation voltage of the LED circuit 50 and the optocoupler 34 in this embodiment is from the capacitor C3. As shown in FIG. 5, because the feedback control is based on the current through the LED circuit 50, the voltage waveform of the capacitor C3 is as the fourth waveform in the figure, and this waveform is exactly the illumination status of the LED circuit 50. With regard to the secondary side circuit 32, since it is an IC which requires not much current (far less than what the LED circuit 50 requires), a low capacitance capacitor C2 is enough to sustain the voltage required for keeping the secondary side circuit in the operation mode. In other words, regardless whether the EN signal is at high level or low level, the secondary side circuit 32 is kept in the operation mode. Therefore, when the EN signal changes from low level to high level, the secondary side circuit 32 only needs a very short response time, so the LED circuit 50 can illuminate at a more precise timing. Under such arrangement, when the capacitor C3 is fully discharged and the operation voltage of the LED circuit 50 and the optocoupler 34 is totally lost, because the secondary side circuit 32 is kept in the operation mode, the voltage at critical nodes connected to the secondary side circuit 32 can be designed to be sustained such that the circuit can respond quickly in the next cycle. More specifically:

Taking the embodiment of FIG. 3 for example, to make the circuit response quick in the next cycle, the most important node whereat voltage needs to be sustained is the negative terminal of the optocoupler 34. When the operation voltage of the LED circuit 50 and the optocoupler 34 is lost, the operational amplifier 33 turns off the transistor Q because no current through the LED circuit is detected; thus, the current flowing through the optocoupler 34 becomes zero, and because there is no current, the voltage at the negative terminal of the optocoupler 34 is kept. If the positive terminal of the optocoupler 34 is connected to the capacitor C2, to share a common voltage source with the secondary side circuit 32, the aforementioned advantage cannot be achieved, and the capacitance of the C2 must be increased.

Figure 6:
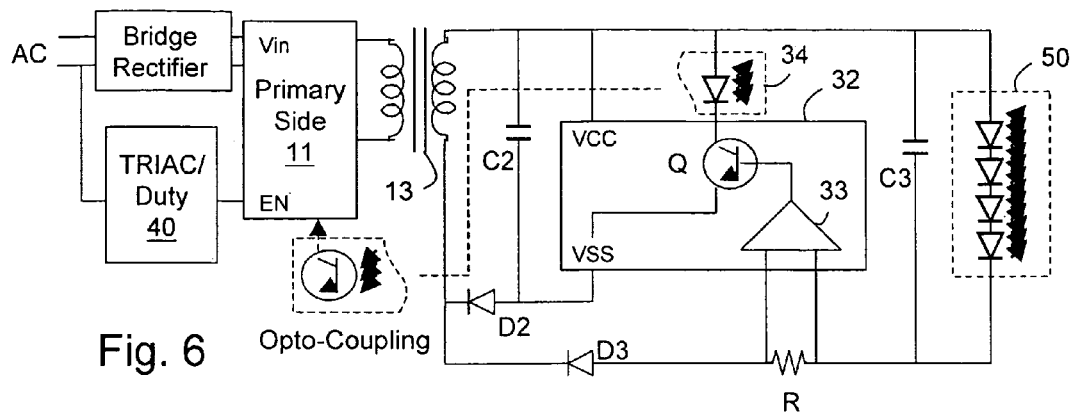
FIG. 6 to FIG. 10 show several other embodiments of the present invention.

FIG. 6 shows another embodiment of the present invention, which is similar to the embodiment shown in FIG. 3 except that the diodes D2 and D3 are placed in different paths.

Figure 7:
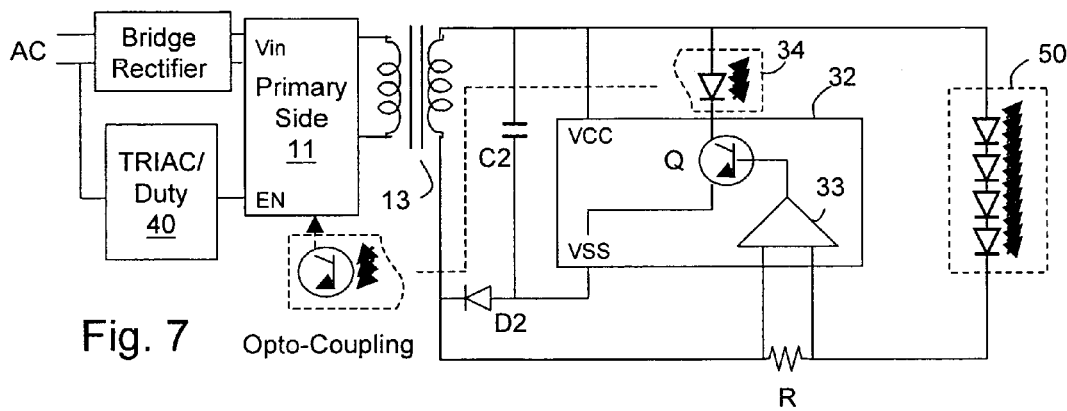

FIG. 7 shows another embodiment of the present invention. Because the LEDs themselves are current rectifiers, this embodiment omits the diode D3. In circuit operation, the LEDs only illuminate when the secondary side of the transformer is conducting. Preferably, the lower frequency bandwidth of the feedback signal is decreased in this circuit.

Figure 8:
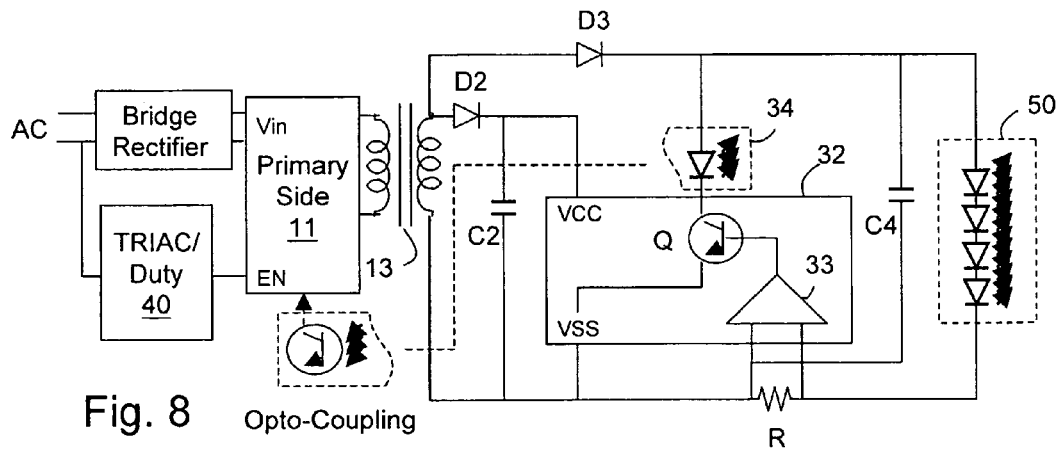
Figure 13:
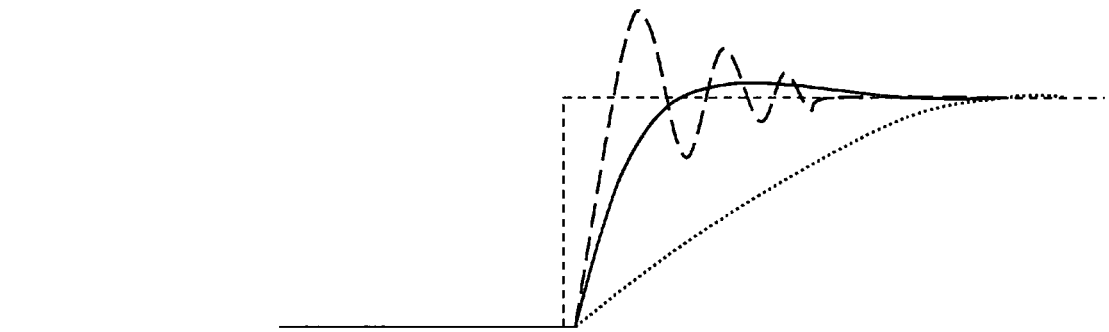
FIG. 13 shows the relationship between the two capacitors C3 and C4 and the damping status of the circuit.

FIG. 8 shows another embodiment of the present invention. This embodiment connects the lower end of the capacitor C4 to the left end of the resistor R, not the right end of the resistor R (the lower end of the LED circuit 50). The difference between connections to the right end and left end of the resistor R is thus. A Zero is generated in the circuit if a capacitor (the capacitor C3) is connected to the right end of the resistor R, and a Pole is generated in the circuit if a capacitor (the capacitor C4) is connected to the left end of the resistor R. To the basic purpose of the present invention, Zero or Pole makes no difference. The effect to the circuit by Zero or Pole is shown in FIG. 13. When the capacitance of the capacitor C3 is too low or the capacitance of the capacitor C4 is too high, the circuit will operate in an under-damping condition. When the capacitance of the capacitor C3 is too high or the capacitance of the capacitor C4 is too low, the circuit will operate in an over-damping condition. When the capacitor C3 or C4 has a proper capacitance, the circuit will operate in a critical-damping condition, in this case the circuit will reach its steady status through an optimum approach. In other words, when the capacitor C3 is used and under-damping is found, the capacitance of the capacitor C3 should be increased. When the capacitor C3 is used and over-damping is found, the capacitance of the capacitor C3 should be decreased. When the capacitor C4 is used and under-damping is found, the capacitance of the capacitor C4 should be decreased. When the capacitor C4 is used and over-damping is found, the capacitance of the capacitor C4 should be increased.

Figure 9:
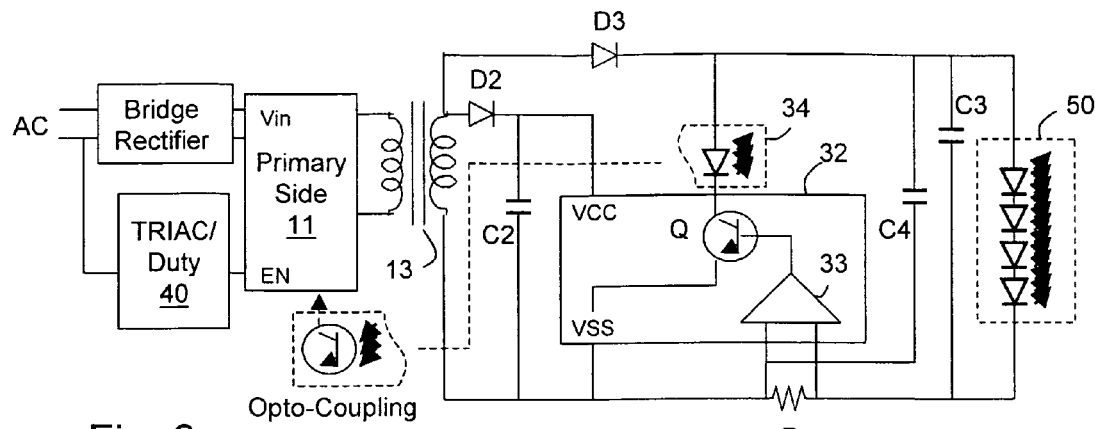

Certainly, the present invention is not limited to using only one of the capacitors C3 and C4; they can both be used as shown in FIG. 9.

Figure 10:
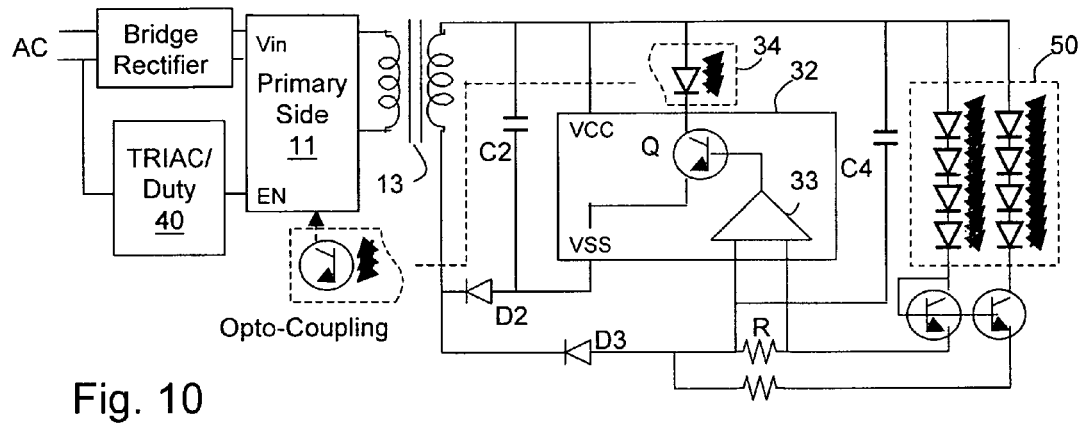

In all the aforementioned embodiments, there is shown only one LED path; however, the present invention is not limited to this. The LED circuit 50 can include more than two LED paths as shown in FIG. 10, wherein a current mirror can be used to duplicate current from one LED path to another. In this case, the resistor R for setting the LED current also functions as a degeneration resistor for the current mirror. FIG. 10 shows that, in this embodiment, the lower end of the capacitor C4 is connected to the left end of the resistor R, and the diodes D2 and D3 are placed in the lower paths, but they certainly can be modified to any other arrangement as described in the above.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the EN signal for dimming control can be generated by other ways, not from the AC signal. As another example, the bipolar transistor Q in the secondary side circuit 32 can be substituted by a field effect transistor. All such variations and modifications should be interpreted as being included within the scope of the present invention.

What is claimed is:

1. A driver circuit comprising:
a primary side circuit receiving rectified AC power;
a transformer coupled to the primary side circuit and converting a primary voltage to a secondary voltage which is supplied to a load circuit;
a secondary side circuit coupled to the transformer, the secondary side circuit detecting current flowing through the load circuit and feedback-controlling the primary side circuit accordingly;
a first capacitor coupled to the secondary side circuit for providing an operation voltage to the secondary side circuit; and
a second capacitor coupled to the load circuit for providing an operation voltage to the load circuit and an optocoupler device,
wherein the primary side circuit has an enable input for receiving an input duty signal, and when the input duty signal dose not enable the primary side circuit, the first capacitor still provides the operation voltage to the secondary side circuit at least for a predetermined period.

2. The driver circuit of claim 1, wherein the load circuit has a first end which is coupled to a resistor, and the secondary side circuit includes an operational amplifier, which compares the voltage difference between two ends of the resistor and feedback-controls the primary side circuit according to the comparison.

3. The driver circuit of claim 2, wherein one end of the second capacitor is coupled to a second end of the load circuit, and another end of the second capacitor is coupled to one of the two ends of the resistor.

4. The driver circuit of claim 1, wherein the primary side circuit includes an enable input, and the driver circuit further comprises an AC signal extraction and conversion circuit for generating a duty signal to control current flowing through the load circuit according to a TRIAC signal.

5. The driver circuit of claim 4, wherein the AC signal extraction and conversion circuit includes a comparator for generating the duty signal by comparing the TRIAC signal with a reference voltage.

6. The driver circuit of claim 4, wherein the AC signal extraction and conversion circuit includes:
a low-pass filter for obtaining a DC level of the TRIAC signal; and
a voltage-to-duty conversion circuit for converting the DC level to the duty signal.

7. The driver circuit of claim 1, wherein the load circuit is an LED circuit.

8. The driver circuit of claim 1, wherein the load circuit includes at least two paths in parallel, and wherein the secondary side circuit detects current flowing through the at least two paths, and feedback-controls the primary side circuit according to the lowest current detected.

9. The driver circuit of claim 1, wherein the load circuit includes at least two paths in parallel, one end of a first path is coupled to a first resistor, and one end of a second path is coupled to a second resistor; and wherein the secondary side circuit includes a first and a second operational amplifiers for comparing the voltage differences of two ends of the first and second resistors respectively and feedback-controls the primary side circuit according to a lower voltage difference of comparisons.

10. A method for driving a load circuit comprising:
providing a primary side circuit receiving rectified AC power;
providing a transformer coupled to the primary side circuit and converting a primary voltage to a secondary voltage which is supplied to the load circuit;
providing a secondary side circuit coupled to the transformer, the secondary side circuit supplying the secondary voltage to the load circuit;
enabling the primary side circuit according a duty signal; and
keeping the secondary side circuit in an operation mode at least for a predetermined period when the duty signal does not enable the primary side circuit.

11. The method of claim 10, wherein the step of keeping the secondary side circuit in an operation mode includes:
coupling the secondary side circuit with a first capacitor; and
coupling the load circuit and an optocoupler device with a second capacitor.

12. The method of claim 11 further comprising: adjusting capacitance of the second capacitor according to damping status when driving the load circuit.

13. The method of claim 11, wherein a first end of the load circuit is coupled to a resistor, and wherein the second capacitor has a first end coupled to a second end of the load circuit, and a second end coupled to one of two ends of the resistor, the second capacitor presenting a zero or a pole depending on which end of the resistor the second capacitor is coupled to, and the method for driving a load circuit further comprising:
detecting damping status when driving the load circuit;
when the second capacitor presents a zero, increasing the capacitance of the second capacitor if under-damping is detected, and decreasing the capacitance of the second capacitor if over-damping is detected; and
when the second capacitor presents a pole, decreasing the capacitance of the second capacitor if under-damping is detected, and increasing the capacitance of the second capacitor if over-damping is detected.

14. The method of claim 10, wherein the load circuit is an LED circuit.

15. The method of claim 10 further comprising: controlling current through the load circuit according to the duty signal.

16. The method of claim 10 further comprising: generating the duty signal according to a TRIAC signal.

17. The method of claim 16, wherein the step of generating the duty signal according to a TRIAC signal includes: comparing the TRIAC signal with a reference voltage.

18. The method of claim 16, wherein the step of generating the duty signal according to a TRIAC signal includes: obtaining DC level of the TRIAC signal, and converting the DC level to the duty signal.

* * * * *